Dec. 18, 1923.   
F. ALLISON   
1,478,196
STARTING AND LIGHTING SYSTEM
Filed May 29, 1920   7 Sheets-Sheet 1
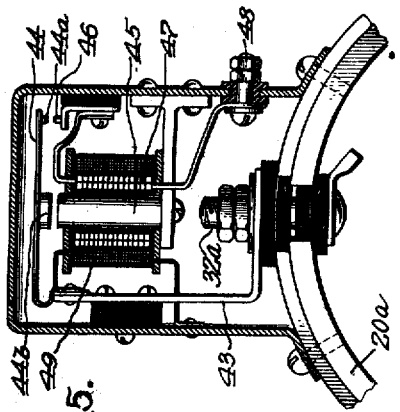
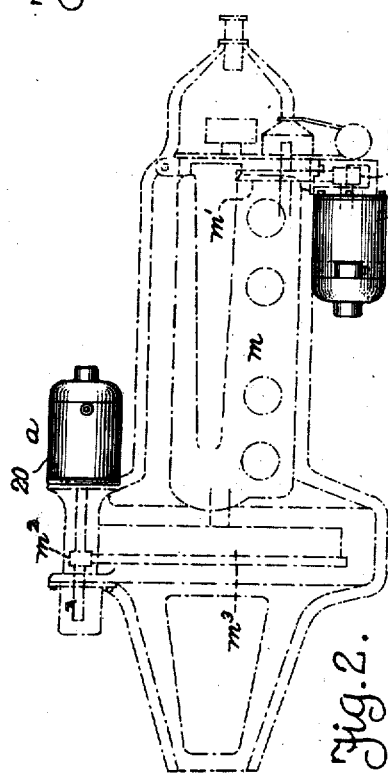
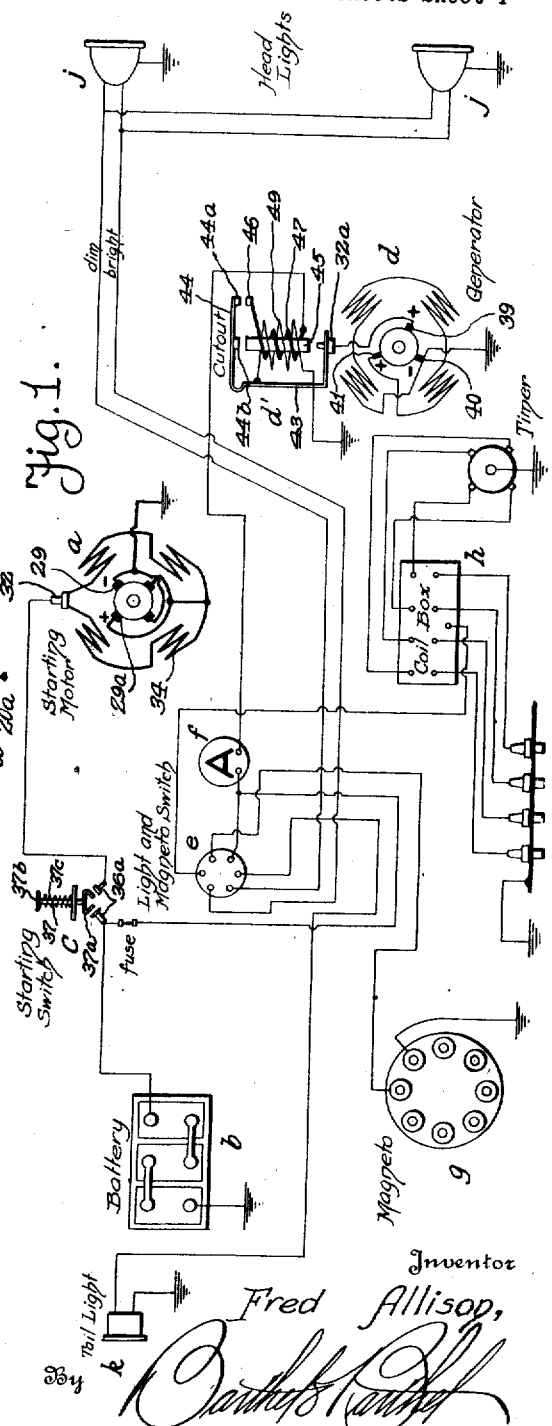
Inventor
Fred Allisop,
By Bartel & Bartel
Attorneys Dec. 18, 1923.

F. ALLISON 1,478,196

STARTING AND LIGHTING SYSTEM

Filed May 29, 1920       7 Sheets-Sheet 2

Inventor
Fred Allison,

Dec. 18, 1923.

F. ALLISON 1,478,196

STARTING AND LIGHTING SYSTEM

Filed May 29, 1920　　7 Sheets-Sheet 5

Inventor
Fred Allison,
By
Attorneys

Dec. 18, 1923.
F. ALLISON
1,478,196
STARTING AND LIGHTING SYSTEM
Filed May 29, 1920
7 Sheets-Sheet 6
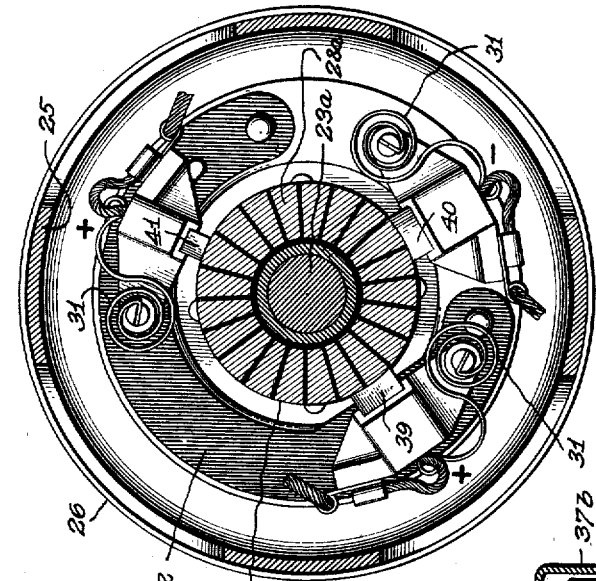
Fig. 14.
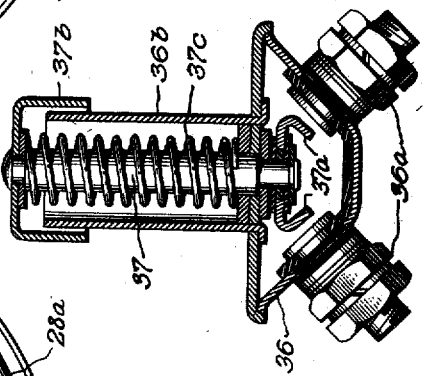
Fig. 9.
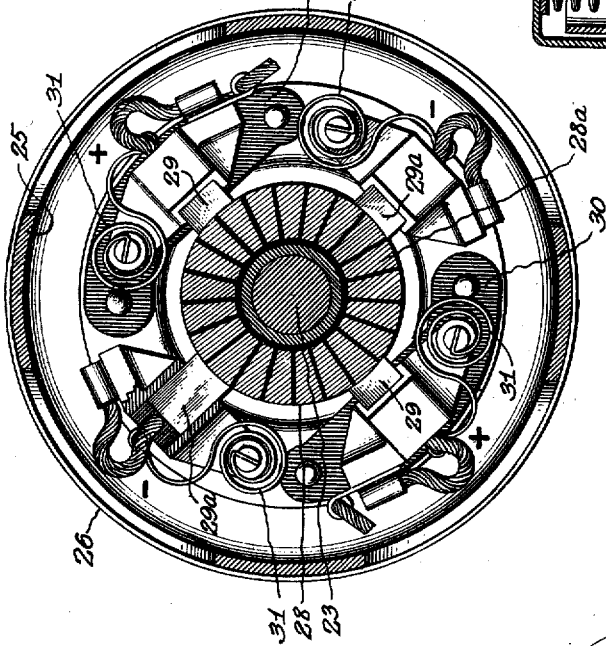
Fig. 7.
Inventor
Fred Allison,
By 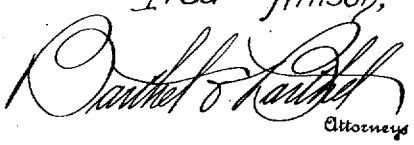
Attorneys

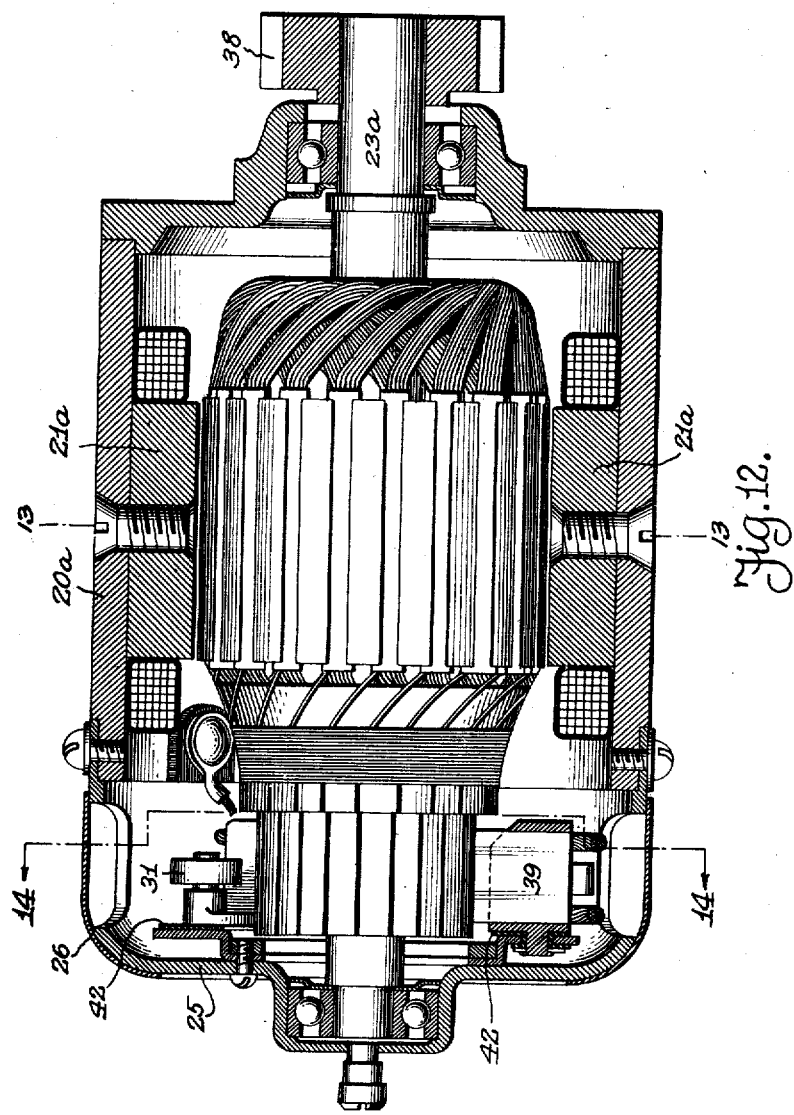

Patented Dec. 18, 1923.

1,478,196

UNITED STATES PATENT OFFICE.

FRED ALLISON, OF DETROIT, MICHIGAN, ASSIGNOR TO FORD MOTOR COMPANY OF DELAWARE, OF DETROIT, MICHIGAN, A CORPORATION OF DELAWARE.

STARTING AND LIGHTING SYSTEM.

Application filed May 29, 1920. Serial No. 385,266.

*To all whom it may concern:*

Be it known that I, FRED ALLISON, a citizen of the United States of America, residing at Detroit, in the county of Wayne and State of Michigan, have invented certain new and useful Improvements in Starting and Lighting Systems, of which the following is a specification, reference being had therein to the accompanying drawings.

This invention relates to improvements in starting and lighting systems for motor vehicles, pertaining more particularly to systems of the two-unit type in that the starting motor and the generator are separate instrumentalities but adapted to cooperate both with the internal combustion motor—herein termed the engine—and the storage battery.

In the installation of systems for the purpose of starting the engine and for lighting purposes, certain problems are inherently present, due to (*a*) the fact that the entire system is carried by a traveling carrier—the vehicle—and must therefore include all of the elements necessary for proper operation; (*b*) is generally an addition to a standard form of motor vehicle construction, and therefore must be of a type such as will not require material changes from the standard vehicle design; and (*c*) must be capable of meeting the conditions brought about by the fact that the motor vehicle engines are generally constructed under conditions of production capacity, and therefore have more or less variation as to factors which must be considered in the production of systems for starting and lighting, these factors being especially important in connection with the requirement of the starting motor. These factors, while pertaining to the carrier for the system rather than to the system itself, are more or less controlling in the production of the system.

For instance, the traveling carrier—the vehicle—takes the system away from a fixed base of supply, and the system must therefore not be dependent on a fixed base of supply; the exception permitted is the storage battery instrumentality which has elements capable of renewal, but which are maintained for lengthy periods of time.

The second factor is of importance because of the fact that motor vehicle designs are standard—to permit of production under capacity conditions—with the standard based on conditions independent of installations of starting and lighting systems; in other words, the design factors of the vehicle are based on vehicle conditions rather than on questions of installation of starting systems. Since these design factors pertain to the vehicle the addition of a system of the present type is made dependent generally on the non-disturbance of the general design. And, due to this fact, the question of available space for the installation becomes of vital importance in the formation of the system to be added, this question bearing on the position of the units, size of units, character of operative connections with the engine, etc.

The third factor also has its bearing on the character of the system, aside from the fact that even under ideal and perfect engine construction, the question of operative speeds of the engine have a bearing on the specific form of the units; for instance, the generator is in constant driven relation with the crank shaft of the engine and must therefore be capable of operation under maximum speed conditions, although such conditions are met with at only infrequent intervals. The third factor is brought into question through the fact that under production conditions of the engine there is no certainty that the compression and expansion values within the cylinder are exactly similar in successively-produced engines, these values varying within limits; and such variations have a bearing on the operations of the starting motor. This latter is due to the fact that the starter motors must also be constructed under production conditions and hence cannot be individually designed for an individual engine, but must be designed to operate with the type of engine and the engine support and be operative under the conditions of a possible installation.

In addition, other factors are present, these bearing on the construction of the units of the system. One of these is efficiency of operation by structures built to meet the general factors above pointed out, since the structures must be capable of heavy service conditions, and able to withstand the severe character of service provided by installation on a motor vehicle operating under widely varying conditions. Another factor is that of cost of production, and in this the character and design of the units is of importance, since the two units are designed for radically different duties; by utilizing unit elements of similar design in both motor and generator, element standards are provided which permit of greater capacity and less cost of production as well as of cost in assembly.

The present invention is designed to meet these various factors, as will be clear from a brief statement thereof in connection with the specific embodiment shown herein, this being a form used as the starting and lighting system of the Ford automobile. As is well known, the Ford cars are produced in large quantities and therefore require that the parts be produced with each part of standard design, and these designs are necessarily based on car operation independent of any system such as herein disclosed, since the installation of the system is optional with the purchaser. The system must therefore be capable of installation on such standard car and without requiring material modification of the car; this brings in the question of available space, etc., for the installation.

At the same time, construction of system units must necessarily be on a production basis, since a reasonable percentage of purchasers of the car production desire the additional installation, the system providing positive advantages in the operation of the car. And because of the advantages accruing from its use, it is desirable that the cost of the system be retained as low as possible in order that the total cost of the car be not largely increased.

Since both car and system are produced on a quantity production basis, each is dependent on standards of design capable of producing these results as to production and also efficiency results in operation.

These results are obtained in the present invention by the character of the unit design and characteristics, and the manner in which the units are mounted in the system and in the carrier—the car.

To these and other ends, therefore, the nature of which will be greatly understood as the invention is hereinafter disclosed, said invention consists in the improved construction and combination of parts, hereinafter more fully described, illustrated in the accompanying drawings, and more particularly pointed out in the appended claims.

In the accompanying drawings, in which similar reference characters indicate similar parts in each of the views:—

Figure 1 is a diagrammatic view of one embodiment of a system according to the present invention, the same being shown as applied to complemental elements of an installation;

Fig. 2 is a diagrammatic view showing the location of the motor and generator units relative to an engine;

Fig. 4 is a similar view of the field connections of the motor;

Fig. 5 is a view partly in section and partly in elevation of a portion of the motor unit, the section being taken approximately on line 5—5 of Fig. 6;

Fig. 7 is a similar view taken approximately on line 7—7 of Fig. 5;

Fig. 8 is a diagrammatic view of the magnetic circuits of both units;

Fig. 9 is a sectional view of the starting switch;

Fig. 14 is a similar view taken approximately on line 14—14 of Fig. 12, and

Fig. 15 is a detail sectional view of the cut-out.

Figure 3:
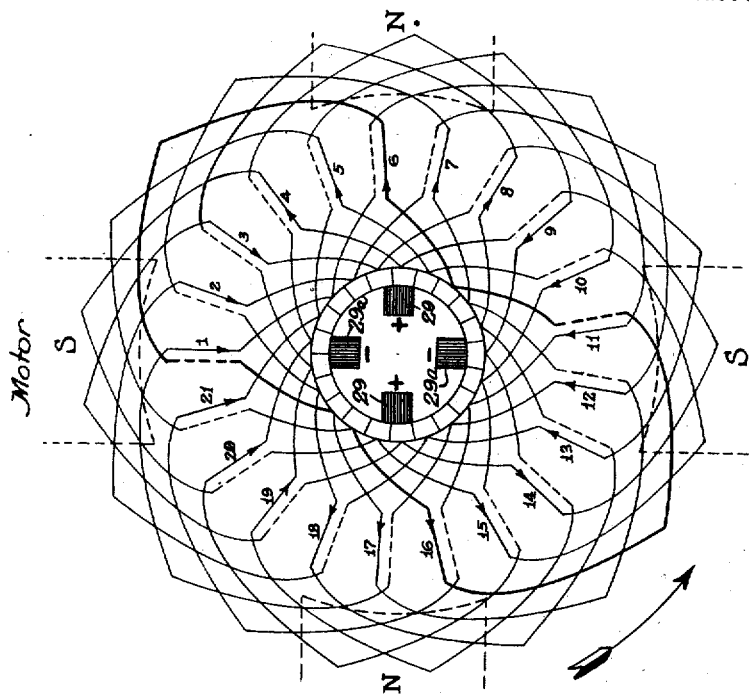
Fig. 3 is a diagrammatic view showing the wiring of the motor armature.

The system generally, as employed in the particular embodiment disclosed, is shown diagrammatically in Fig. 1, this view including other portions of the engine installation, to indicate the general operation. The system proper includes a starting motor —a—, storage battery —b—, starting switch —c—, these providing for the starting of the engine, generator —d— with its cut-out —d'—, adapted to automatically connect up the generator to the battery to charge the latter under predetermined conditions, and the wiring and control features which render these parts operative in the performance of duty in the operation of the car. For instance, —e— indicates a switch for controlling the lamp and ignition circuits, this switch being shown as a single switch but which may obviously be divided into two switch elements if desired; —f— indicates an ammeter connected in the circuit, —g— a magneto which normally supplies the ignition circuit, —h— the coil box in the ignition circuit, —j— the headlights, and —k— the tail light.

As will be seen from Fig. 1, a circuit is completed through motor —a— from battery —b— when switch —c— is closed, the circuit connections between the battery and generator being broken at cut-out —d'—; generator provides for the starting of the engine, this motor operation turning the crank-shaft of the engine. Switch —e— is adapted to connect up either the battery or the magneto to the ignition circuit, permitting the engine to operate from either source; it is preferred to supply the ignition circuit from the battery when starting, after which the switch is operated to disconnect the battery from this circuit and connect the magneto in such circuit. The head and tail lights are supplied wholly from the battery, this control being shown as present in switch —e—.

In Fig. 2 there is shown diagrammatically the location of the motor —a— and generator —d— relative to the engine casing, the engine unit being shown in dotted lines at —m—. The motor and generator are shown as mounted on opposite sides of the engine and, in practice, the motor is connected up to operate with the fly wheel of the engine while the generator is connected to be driven by the large timer gear, indicated at —m—. The connections of the motor and fly wheel are of the speed-responsive type, the particular structure employed being that known as the Bendix drive in which a pinion —$m^2$— is shifted into and out of engagement with the gear teeth of the fly wheel —$m^3$—, the pinion being shifted into engagement by the motor operation and out of engagement by the higher speed of the engine when the latter operates under its own power. The specific connections are not disclosed, since the Bendix drive is of more or less standard type and well known. It will be understood, of course, that other forms of connection between the motor shaft and the crank-shaft may be employed instead of the Bendix drive, the particular form of the structure employed to effect the automatic operative engagement and disengagement of the motor and crank-shaft being more or less immaterial.

To provide for the desired operation of the parts certain gear ratios are employed between the crank shaft and the motor and the generator, and in the particular embodiment shown the ratio between motor and crank-shaft is of a twelve-to-one ratio, while that between the crank shaft and the generator is that of three-to-two ratio. The system operates on practically a six-volt basis, and these ratios, with motors and generators designed generally along the lines presently described, will produce the proper operation of the system within the space limitations permitted by the standard construction of the car itself.

Obviously, the successful operation depends to a great extent on the design of the motor and generator, and the ability to produce these elements under sufficient capacity conditions and at comparatively low cost is more or less dependent on the ability to standardize the parts which form the motor and generator units. These results have been obtained by the use of structures constructed and arranged on the basis of certain factors which will be briefly referred to.

The starting motor.

The motor operates at six volts potential and is of the series type. The design, while of the direct current type, carries radical changes from the type usually employed for this particular duty, the purpose being to provide efficiency—based on the pound-torque as compared to pound weight of the motor—of the highest order. This is accomplished by a very close design through the provision of an approximately true balance between the several factors which enter into the motor construction.

As is well known, the effective development of torque in a motor is dependent on a proper space relation between the field flux and the armature current, the maximum torque for a given current being obtained when the axis of the armature current and the field flux are at right angles to each other. In all motors, the E. M. F. impressed upon the terminals must be consumed in overcoming the counter E. M. F. and ohmic drop due to resistance of armature winding and brush contact drop, together with friction, iron and windage losses. Hence, these assumptions show that torque is dependent on flux, current and conductors and is independent of speed.

The particular duty required—to start a heavy load from a position of rest—requires that the starting torque be larger than the running torque of the motor, and while this condition could be met by designing the motor for breakdown duty, the space limitations, the size of the motor and its cost are prohibitive factors.

As torque is dependent on flux and on armature current, the service to be performed requires the use of large cross-sectional areas of iron to convey flux and of large cross-sections of copper for the armature current. These factors, with others such as armature reaction, commutation, demagnetizing effects and losses due to working at too high flux and copper densities for given dimensions, obviously present, as the problem of design, the problem of the proper proportioning of the copper and iron, or the proper proportioning of the electric and magnetic circuits to a true balance or medium or approximately so.

Since the motor is of the series type, the general characteristic that the greater the load application the greater the torque through the increase in armature current and field flux, is present, but this tendency is more or less limited in the present design by reason of the limitations as to the amount of iron and copper capable of being used within the space possibilities available in the motor installation, limitations which would tend to distort the field flux to such an extent as to retain but little commutating field to reverse the coils undergoing commutation. Entire elimination of field distortion is not necessary the principal consideration being that a commutating field of sufficient intensity is present to generate—in the coils undergoing commutation—an E. M. F. large enough to neutralize the reactance voltage generated by the short-circuited coils.

Owing to the fact that the cars and their engines are being produced on maximum production basis, variations in the torque characteristics of the engines are inevitable, and it is therefore impracticable to employ resistance commutation, the values of the ohmic drop in the coil and the brush contact surface such as would be usable as resistance factors under these conditions, would be such as to materially reduce the torque. Hence, voltage commutation is employed, the construction being such as to provide a close proportioning of the magnetic to the electric circuits and the elimination of the distortion to the full extent.

While voltage commutation is employed generally in motors of certain types, the conditions underlying the service of the motor of the present invention are such as to materially effect the use of such commutation as generally taught. This result can generally be produced by displacing the axis of commutation slightly from the neutral axis in such directions as to place the fringing field at the trailing pole tip, but the change of values of the generated E. M. F. provided by the travel of the short-circuited element through such fringing field affects the constancy of the reversing E. M. F. value required to balance the retarding effect of the self-induced E. M. F. in the element. And while self-inductance can be kept within limits through an armature design with one turn or of a minimum number of turns, the additional factors in considering the value of the inductance—the amount of flux leakage per ampere of current in a coil and the axial length of the armature—must be considered, since these additional factors must be kept down, the result being an increase in diameter of the armature with a consequent increase in the number of segments and of the diameter of the commutator. And while this might be offset by the use of a wider brush, this in turn brings in the factor of increase in number of coils simultaneously short-circuited, producing a high mutual induction equal to or greater than the original self-induction. Increase of diameter, however, introduces the factor of space limitations, size being necessarily considered by reason of the requirements as to position of the motor shaft to accommodate for the connections between the armature shaft and the crank-shaft of the engine, and yet retain the whole within the space allowable for the installation.

Another factor is that of the variations in the commutating E. M. F. not only with respect to the linear function of time but also with respect to the changes produced by the changes in load, it being obvious that good commutation at one load would not be good for other loads unless corrective devices be employed. This is due to the shifting of the field flux or its distortion set up by the cross-magnetizing effect of the armature current when under load conditions—armature reaction. Corrective devices, such as interpoles or compensating windings, cannot be employed because of the conditions underlying the installation, and since the position of the brushes cannot be shifted during service to meet the conditions of load variations, the factor must be met in a different manner.

This is met by the use of a design such that under load conditions the short-circuited coil is under the influence of the pole in advance of the neutral axis opposite the direction of rotation, the brushes being permanently set so that under no load conditions the commutating field has a certain value sufficient to generate an E. M. F. in the short-circuited coils, the brush position being such that at no load the commutating E. M. F. is well within the sparking limit and while operating at full load the reactance voltage set up by the short-circuited coil will be opposite in direction to that of the commutating E. M. F. the difference between these also being within the sparking limits. In addition, there is maintained a ratio between armature ampere turns and field ampere turns per pole to produce a powerful or stiff main field as compared to that of the armature fields.

In designing the motor to meet the conditions of service in the particular embodiment shown, the calculations are based on a 500 ampere input, a working flux density of 500,000 lines per square inch, and the use of twenty-one conductors, these being, of course illustrative with respect to the current or flux. These values, however, indicate the balanced relation of the copper to the magnetic circuits by means of which an exceptionally high torque is obtained both with respect to efficiency and of weight.

Figure 6:
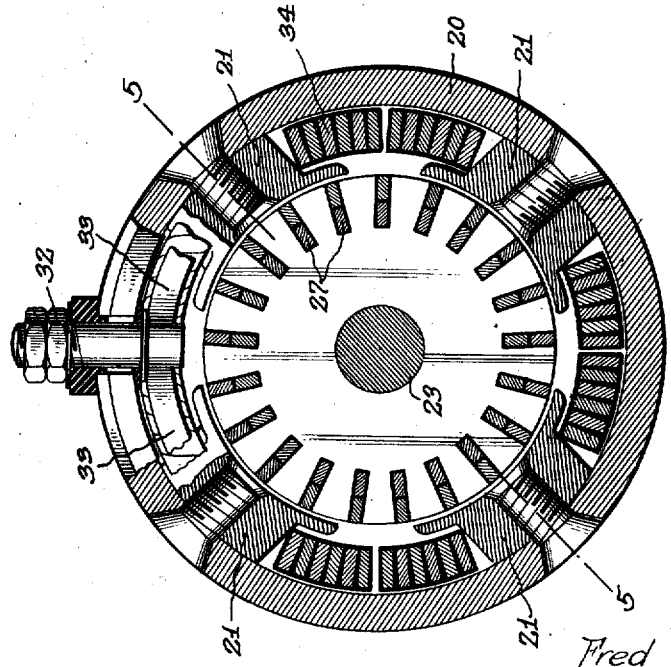
Fig. 6 is a transverse section taken approximately on line 6—6 of Fig. 5.

The specific embodiment of the motor is shown in Figs. 3 to 7, Figs. 3 and 4 showing diagrams of the windings and field connections, Figs. 5 to 7 showing the physical structures employed.

Referring to Fig. 5, 20 indicates the yoke —shown as tubular—four pole shoes 21 being bolted thereto in symmetrical position, each shoe extending through substantially 75% of the pole arc, with an area of 3.575 square inch, and a length of 2.125 inches and a radial length of .09375 inches. The yoke is secured to a bracket 22—by means of which the motor is secured to the casing of the engine—and in which is mounted the shaft 23 of the armature, the latter having a length sufficient to carry the elements of the Bendix drive, the opposite end of the shaft being supported in a bearing 24 located in a cap 25 carried by the yoke. Bracket 22 and cap 25 practically close the opposite ends of the yoke, a dust cap 26 overlying cap 23 and serving to cover openings formed in cap 25 through which access may be had to the commutator, etc., when desired.

The various field connections of the motor are shown in Fig. 4, the motor being of the series type, the armature having its windings arranged in series divided into two paths, the field being wound for series parallel operation with two paths, while the brushes are arranged in pairs in parallel as indicated in Fig. 1. The wiring diagram of the motor armature is shown in Fig. 3, the armature having twenty-one slots with each slot carrying portions of two conductors, the commutator having twenty-one segments. As will be seen from Fig. 3, the windings are of the wave or two-circuit, series drum type, with one portion of a conductor located at the inner end of one slot and the return portion occupying the outer end of the sixth slot therefrom, the free ends of the conductor being secured to segments with one end secured to the tenth segment from the segment to which the other end is secured. The manner of locating the conductors in the slots is shown in Figs. 5 and 6, the conductors being indicated at 27.

The commutator is indicated at 28, being formed with twenty-one segments 28ª. The brushes are represented at 29 and 29ª, the positive brushes 29 leading the current from the field into the armature, through the commutator, the negative brushes 29ª being grounded to the motor frame. The particular brush construction is shown more particularly in Fig. 7, the brush-holders of brushes 29 being insulated by suitable insulation 30, while the brush-holders of brushes 29 are mounted on studs grounded on the motor frame. As shown, the brushes are maintained in contact by suitable springs 31. 32 indicates the terminal (Fig. 6), the stud being insulated from and carried by the yoke 20, the terminal conductors 33 being connected to the field coils in suitable manner, the coils being indicated at 34.

The motor has a stall torque of from fourteen to sixteen foot pounds, and draws between 175 to 225 amperes when turning over the engine, depending on temperature and engine conditions. As will be understood, the torque effect produced when compared with the size of the motor, is very high, and to indicate the size a few of the dimensions are presented. The outside diameter of the armature is 2.8125 inches with the core length 2.025 inches. The cross-section of a conductor is .104 inches x .211 inches, with the mean length of a turn 10 inches, the total resistance being .001706 ohms. The weight of copper in the armature is 1.348 lbs. and in the field 2.025 lbs., the number of turns per pole of the field being seven, with the radial length of a coil 3 inches. The peripheral speed of the commutator at 1000 R. P. M. is 458 feet per minute.

For the purpose of indicating the length of the paths of the magnetic circuit, Fig. 8 presents a diagram of the magnetic circuits of the motor, this view indicating the general dimensions of the motor—and of the generator—with respect to the iron or magnetic circuits in the particular embodiment shown, the dimensions, when compared with those of copper or electrical circuits heretofore pointed out, indicating the close proportioning of the two circuits relative to each other to provide the balanced relation between the two and which provide the exceptionally high torque value conditions with minimum weight and size, and at the same time provide for the desired efficiency.

As shown in Fig. 1, the motor is designed to be operatively connected to the battery at will through starting switch —c— this switch having this one function. The particular embodiment employed is shown in Fig. 9, this being a structure capable of manufacture under large production conditions and at the same time meet the various service conditions. The switch is, in practice, operated by the foot of the driver of the car, and should therefore be of a character to withstand the shocks and jars made possible through accidental contact of the feet of the driver with the portion of the switch which is exposed for manipulative purposes.

The switch is of simple formation comprising a casing 36 carrying the terminals 36ª and also carrying a barrel 36ᵇ within which is mounted a rod-like element 37, carrying the bridging contact member 37ª and the cap 37ᵇ, a spring 37ᶜ serving to normally retain the circuit broken.

The function of the switch is simply to complete the circuit to the motor from the battery. This starts the motor, the rotation of which renders the Bendix drive active. As is well known, the latter structure is of a type such as to cause a pinion to be carried automatically into engagement with a gear on the crank-shaft, this movement being provided by the rotation of the motor, thereby providing a time factor in the motor operation and which slightly delays the application of the load and permits the motor to begin rotation under practically noload conditions, the load being applied suddenly by the engagement of pinion and gear. The disengagement of motor and crankshaft is provided automatically by the engine operating under its own power, the speed of rotation of the pinion, during engine operation, being superior to that of the motor shaft, thus causing the automatic disengagement.

Hence, closing of the circuit by switch —c— simply controls the motor operation, the period of load application on the motor being controlled by the Bendix drive, so that no special care is required in controlling the length of time the switch is kept active. After the engine has started, motor operation can be stopped by releasing the switch, thus stopping battery depletion. Should the switch be accidentally closed while the engine is running, no effect other than motor operation will result since the Bendix drive pinion will simply be rejected by the crankshaft gear during the period of operation of the engine.

The generator.

Figure 13:
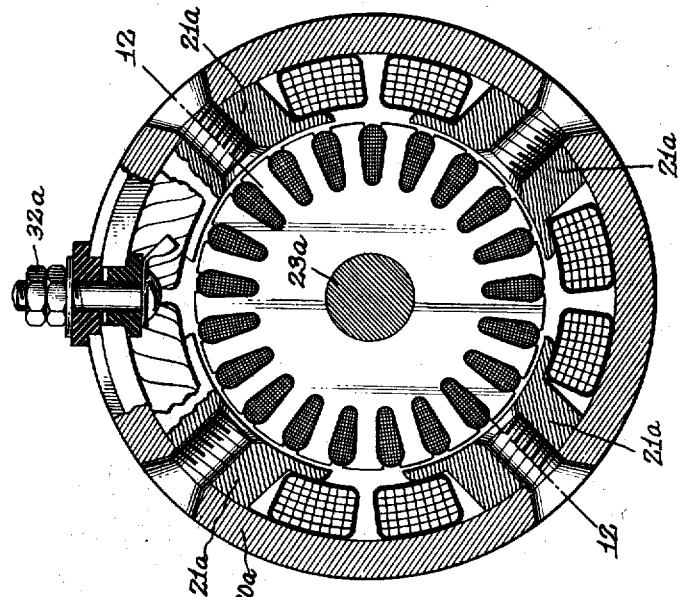
Fig. 13 is a transverse sectional view taken approximately on line 13—13 of Fig. 12.

The generator is of the series wound armature and shunt field type, the general dimensions being similar to those of the motor. For instance, the yoke 20ª and pole shoes 21ª are interchangeable with those of the motor; similarly, the armature has the same general dimensions as that of the motor, the laminations of the core differing slightly in the contour of the slots as shown by comparing Figs. 6 and 13. The windings are arranged similar to those of the motor armature, the conductors, however, being of wire, in the form of coils of the type known as series-parallel lap windings, eleven turns per coil being employed in the particular embodiment shown, the total resistance being 1.19 ohms at 75° F. The weight of copper of the armature is 1.25 lbs. while that of the field is .78125 lb., the field coils being of 100 turns per pole. The commutator is of the same dimensions as that of the motor.

The armature is preferably supported anti-frictionally, and its shaft, 23ª, carries a pinion 38 in constant mesh with timer gear —m'—, the relative sizes of these gears producing a peripheral speed of the commutator of approximately 825 ft. per minute when the engine is operating at 1800 R. P. M., the generator shaft running at one and a half times the speed of the engine crank shaft.

Mechanically and magnetically the generator and motor are substantial duplicates, the differences being mainly electrical.

Figure 10:
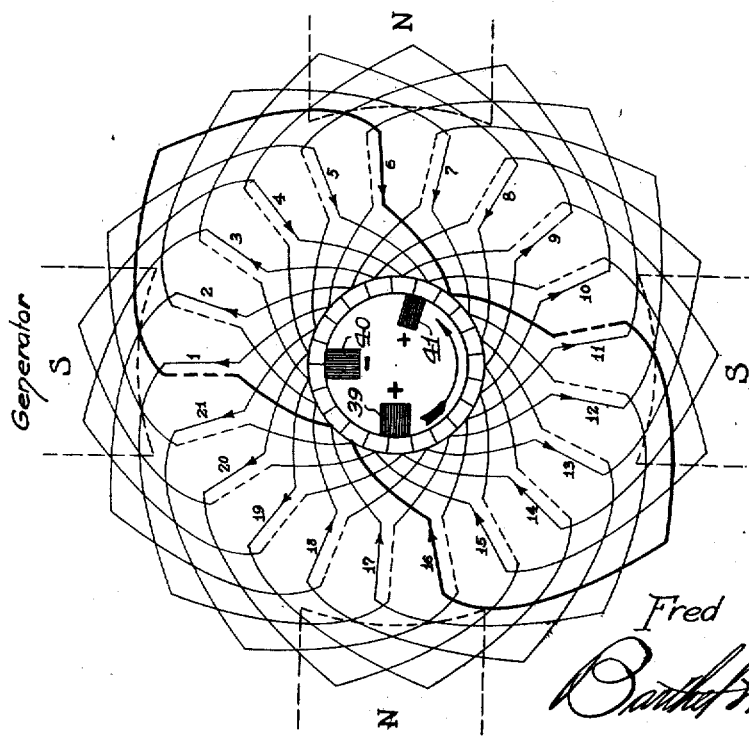
Fig. 10 is a diagrammatic view of the armature windings of the generator.
Figure 11:
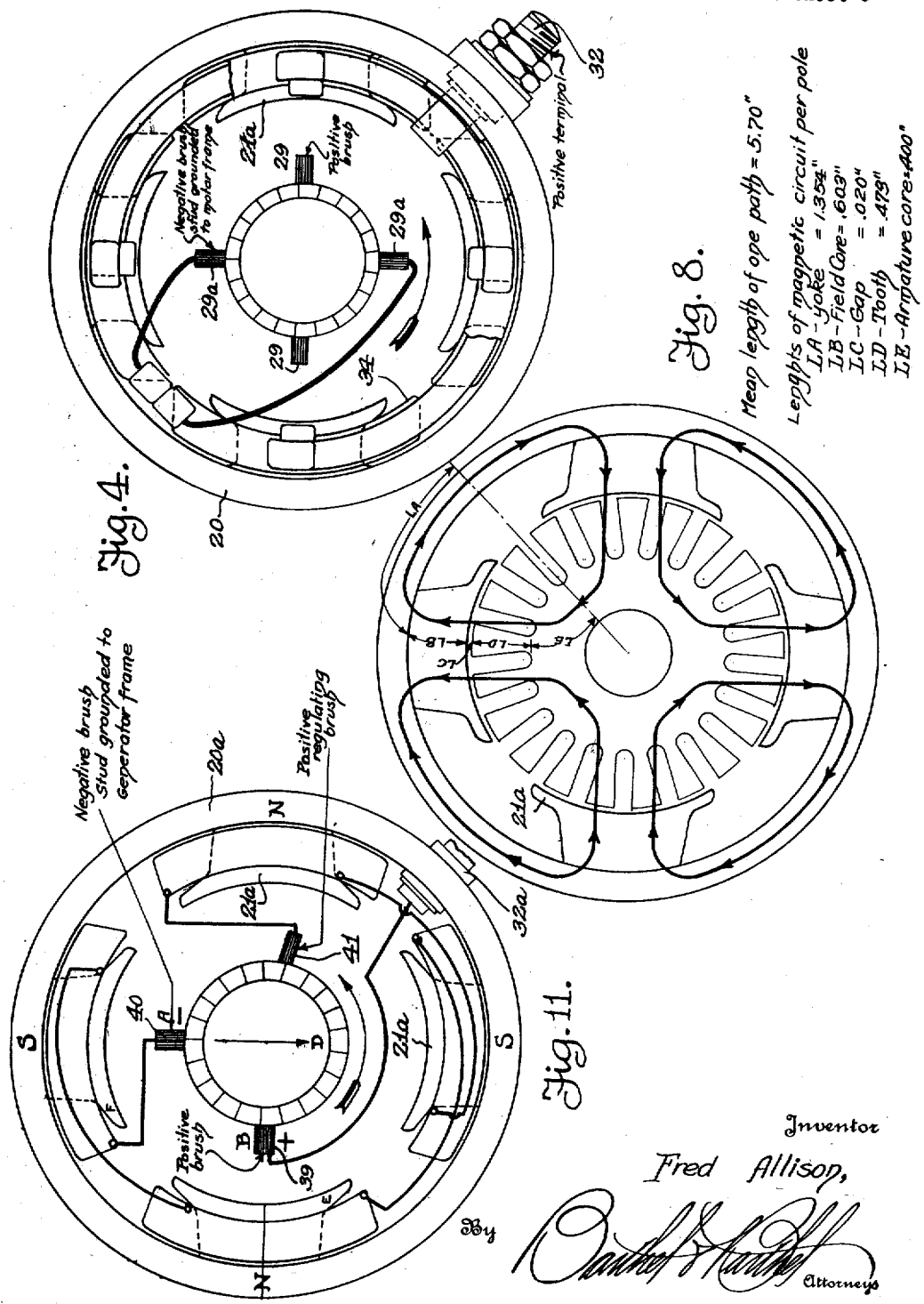
Fig. 11 is a similar view showing the field connections of the generator.
Figure 12:
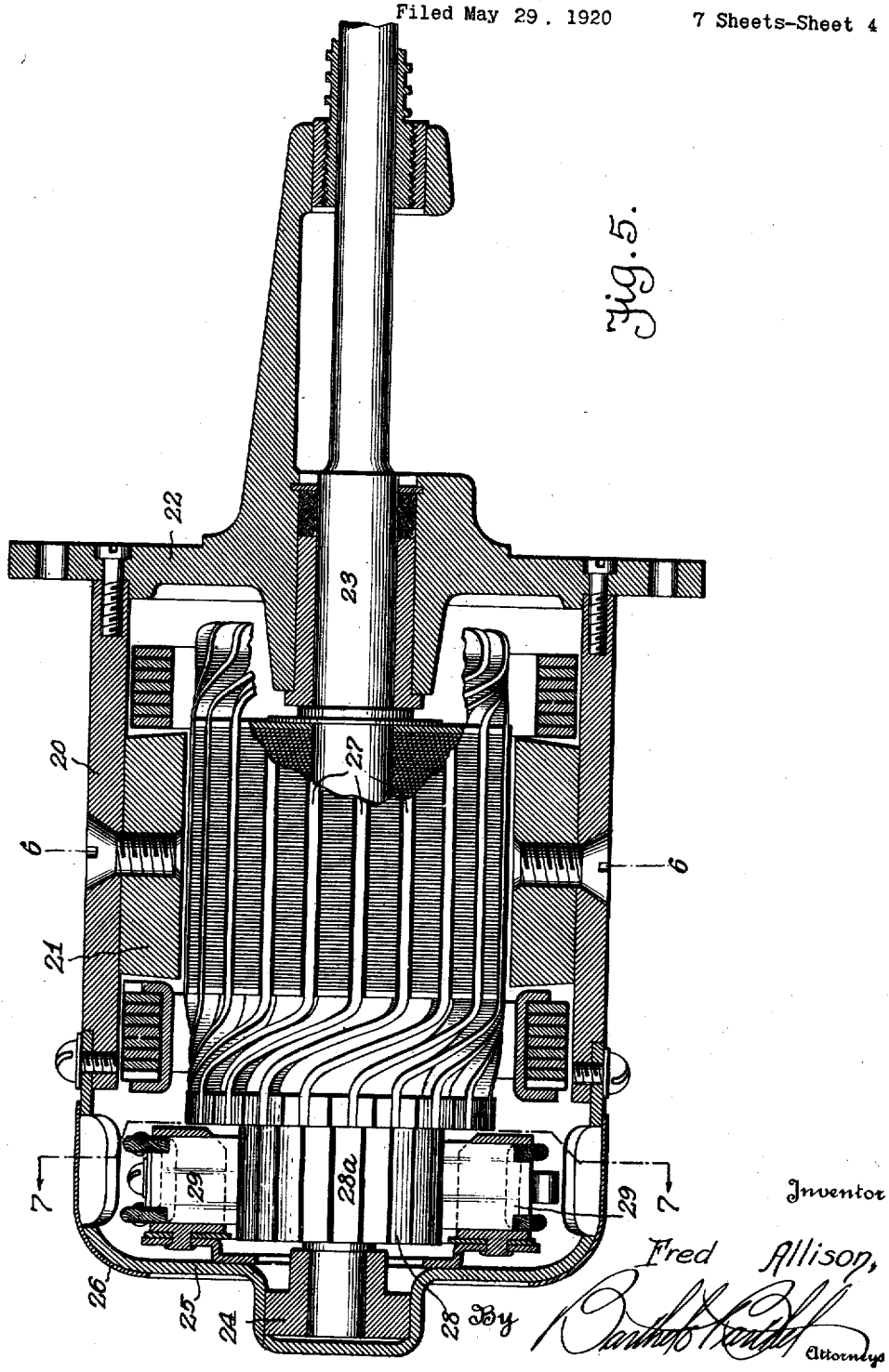
Fig. 12 is a view partly in section and partly in elevation of the generator, the view being taken approximately on line 12—12 of Fig. 13.

Figs. 10 and 11 show diagrammatically the electrical circuits, the main brushes 39 and 40 being set with an angular spacing of 90 degrees, a third or regulating brush 41 being located opposite one of the main field poles in such position that the voltage and current passing through the shunt winding is affected by the distortion or shifting of the field due to speed changes, the brush being adjustable mechanically. The use and regulation of brush 41 serve to control the charging rate of the generator, since its regulation affects the voltage between the terminals of the shunt field winding, thus controlling the charging rate. Brush 39 is the positive brush leading to the automatic cut-out —d'—, brush 40 being the negative brush grounded onto the generator frame.

As shown in Fig. 14, the brush holders for brushes 39 and 41 are insulated from the generator frame by insulation 42, the brush holder of brush 41 being adjustable to permit of adjustment of its brush to produce the regulation referred to. While adjustment of brush 41 is thus made possible, such adjustment is utilized only when the generator is being completed or installed the brush being normally anchored during service conditions. As heretofore pointed out, the system elements are produced on a "production" basis, and the variations present both in generator and engine construction under production conditions, make it desirable to permit of adjustment of this brush to meet the individual conditions of the installation.

As heretofore pointed out, the mechanical construction of the generator is substantially a duplicate to that of the motor, the major portion of the structural elements being interchangeable between the motor and generator. This permits of decrease in cost of production of the system, and enables the system to be produced under large capacity conditions with minimum cost.

The cut-out switch.

As heretofore pointed out the generator is in constant driven relation with the engine and is therefore subject to the variations in speed of the latter. It is therefore desirable that battery charging be had during only a portion of this range, and this is provided by employing a make and break device in the line connecting the generator and the battery, the device being arranged to retain the circuit broken during periods when the current generated is below a predetermined value; this permits the R. P. M. of the generator shaft to determine approximately the time of closing of the circuit, due to the fact that current values are more or less proportional to the speed values.

The device is in the form of a simple cut-out —d— preferably mounted on the generator casing or yoke, the specific structure employed being shown in Fig. 15, the structure being shown diagrammatically in Fig. 1.

As shown, the cut out includes a bracket 43 mounted on the terminal stud 32ª of the generator, said bracket carrying a spring armature 44 having a contact 44ª and a member 44ᵇ preferably of constant polarity, the latter being located opposite the core 45 of a coil formed of two windings, contact 44ª being located opposite a contact 46 carried by and insulated from the cut-out casing and which is, operatively, a terminal of the low resistance winding 47 of the coil, the opposite terminal being shown as terminal 48. A high resistance winding 49 is included in the core this winding having a connection with bracket 43 and with the cut-out casing and thus to ground.

When no current is passing through winding 49, armature 44 maintains the contacts 44ª and 46 separated, and this condition will be maintained until the current values of winding 49 set up sufficient magnetic action in core 45 as to cause the armature to be drawn to contact closing position. When this value is reached the circuit to the battery will be closed—the lead to the battery being connected to terminal 48—the circuit then being from terminal 32ª, bracket 43, armature 44, contacts 44ª and 46, winding 47, terminal 48, ammeter —f— to switch —e— and to battery. As winding 47 is of low resistance, only a sufficient amount of current will then pass through winding 49 to maintain the magnetic action of core 45, the major portion of the current passing through the low resistance winding 47 to the battery.

When the current value of the supply from the generator passes below the predetermined minimum, the value in the battery becomes predominate setting up conditions of reversal of direction of flow in the connections between the battery and winding 47, tending to build up an E. M. F. in the coil and core opposing that of winding 49, thus decreasing the magnetic action of core 45 until it is insufficient to withstand the tension of armature 44—the neutral point of the cut-out—whereupon the armature moves to break the circuit; obviously, any liability of the contacts to stick will be overcome by the building up of this opposing E. M. F. through winding 47 until a condition of reversal of polarity in the core may ensue.

As will be understood the current value effective in closing the charging circuit is determined by the tension value of armature 44, by winding 49 and by the position of the regulating brush 41. Of these, the latter is variable, the armature and the winding being standard. Since the brush 41 serves to control the voltage of the shunt field winding—giving a lower voltage value to that winding, thus affecting the charging rate of the voltage between brushes 39 and 40—the regulation of the position of brush 41 determines the current value effective to produce the E. M. F. value in core 45 requisite to actuate armature 44. In addition, this brush serves to control the variations in charging rate produced by the variations in speed of the generator, the conditions set up by the brush being such that the variations in this rate are retained within a range of from 1.5 to 2 volts rise from the operating voltage of 6.5 volts in operating between minimum and maximum speeds.

By the use of standard armatures 44 and windings 49 of an average value based on activity of the core to close the circuit at a predetermined speed, it will be readily understood that positional variations of brush 41 will correct any inaccuracies brought about by large capacity operations, and a comparatively accurate adjustment secured for the lower limit of speed at which charging will take place. And since the rise in potential produced by the higher speeds is retained within limits, proper charging operations will be had, the system having the usual characteristics of charging systems of a gradual tapering of the charging rate as the battery becomes charged.

In the particular embodiment herein disclosed, the elements are arranged in such manner that the charging circuit is closed when the generator shaft reaches approximately 600 R. P. M. the maximum charging rate being reached at approximately 1200 R. P. M. These correspond, in the Ford car, to ten and twenty miles per hour respectively.

Switch —e— is arranged in such manner as to control the connections to the lighting system from the battery, to permit of dim or bright light operation—the lighting system being independent of the magneto; it also controls the circuit leading to the coil box —k—, either battery or magneto current being usuable in this circuit.

It will be understood, of course, that the specific dimensions stated, are illustrative, being based on the embodiment employed in the installation referred to. Where a different installation is desired, dimensions, etc., would be varied to meet the particular characteristics of the installation, it being understood, however, that the general characteristics of the units will be retained.

From the above it will be understood that the efficient results obtained in the starting motor—simplicity, compactness, powerful torque with high efficiency, and light weight—are obtained by a close design with respect to the magnetic and electrical circuits. These characteristics are obtained by striking a medium between the circuits, in that the copper circuits have a very low resistance with ample conductivity being balanced by the correct number of conductors and pole enclosures, the latter being adapted to provide for maximum torque effect with a minimum energy input. The magnetic circuits are so balanced as to allow minimum leakage and minimum distortion. In other words, the motor is of such low resistance that it is possible to pass very heavy currents to the field and armature circuits at a very low voltage, producing a torque effect impossible with the commercial high resistance starting motors. In addition, the design provides for a very high accelerative speed, which serves not only to prevent back firing in the engine, but produces a more even cranking speed. Generally stated, with a battery of a set voltage and ampere rating, it is possible with this motor to produce considerable torque at a considerable fall of battery potential; at the same time the motor size is small and capable of installation within the space limitations available, and is of comparatively light weight. And since the arrangement is such as to permit of the use of parts capable of production according to set standards, it is possible to produce the unit under large capacity conditions and at a comparatively low cost.

And since the mechanical structure of motor and generator is to a large extent interchangeable, this ability to produce the system under large capacity conditions and at low cost is made possible, producing a system of maximum efficiency, minimum weight, and comparatively low cost.

While I have herein shown and described one embodiment of a system of this general type, it will be readily understood that changes and modifications therein may be found desirable or essential in meeting the various exigencies of use, and I desire to be understood as reserving the right to make any and all such changes or modifications as may be found desirable or necessary, in so far as the same may fall within the spirit and scope of the invention as expressed in the accompanying claims when broadly construed.

What I claim is:—

1. In starting systems of the two-unit type adapted for use in motor vehicle service, wherein the prime mover is of the internal combustion engine type and carried by the chassis of the vehicle and positioned within a zone underlying the vehicle hood, wherein the two units are carried in the prime mover zone, wherein the generator unit is operative to charge a storage battery and the battery is adapted to be electrically connected to the starting motor at will, wherein the generator unit is in permanent operative connection with the crank shaft of the engine and subject to the variable speed conditions of engine service, and wherein the starting motor is adapted to be operatively connected to the crank shaft of the engine at will and is capable of producing a torque characteristic of sufficient value to start the engine under the low voltage service of the storage battery, independent generator and starting motor unit structural formations operative to meet such service conditions, said formations having dimensions to permit of installation within the free space limitations of the prime mover zone, said structural formations including a yoke and pole shoe construction having dimensions such as to permit installation in the magnetic circuit formation, of either the generator or the starting motor.

2. In starting systems of the two-unit type adapted for use in motor vehicle service, wherein the prime mover is of the internal combustion engine type and carried by the chassis of the vehicle and positioned within a zone underlying the vehicle hood, wherein the two units are carried in the prime mover zone, wherein the generator unit is operative to charge a storage battery and the battery is adapted to be electrically connected to the starting motor at will, wherein the generator unit is in permanent operative connection with the crank shaft of the engine and subject to the variable speed conditions of engine service, and wherein the starting motor is adapted to be operatively connected to the crank shaft of the engine at will and is capable of producing a torque characteristic of sufficient value to start the engine under the low voltage service of the storage battery, independent generator and starting motor unit structural formations operative to meet such service conditions, said formations having dimensions to permit of installation within the free space limitations of the prime mover zone, said structural formations including a yoke and pole shoe construction having dimensions such as to permit installation in the magnetic circuit formation of either the generator or the starting motor, with the yoke serving as a casing element of the unit in which it is installed.

3. In starting systems of the two-unit type adapted for use in motor vehicle service, wherein the prime mover is of the internal combustion engine type and carried by the chassis of the vehicle and positioned within a zone underlying the vehicle hood, wherein the two units are carried in the prime mover zone, wherein the generator unit is operative to charge a storage battery and the battery is adapted to be electrically connected to the starting motor at will, wherein the generator unit is in permanent operative connection with the crank shaft of the engine and subject to the variable speed conditions of engine service, and wherein the starting motor is adapted to be operatively connected to the crank shaft of the engine at will and is capable of producing a torque characteristic of sufficient value to start the engine under the low voltage service of the storage battery, independent generator and starting motor unit structural formations operative to meet such service conditions, said formations having dimensions to permit of installation within the free space limitations of the prime mover zone, said structural formations including a yoke and pole shoe construction having dimensions such as to permit installation in the magnetic circuit formation of either the generator or the starting motor, with the pole shoe configuration adapted to receive the field windings specific to the unit in which the construction is installed.

4. In starting systems of the two-unit type adapted for use in motor vehicle service, wherein the prime mover is of the internal combustion engine type and carried by the chassis of the vehicle and positioned within a zone underlying the vehicle hood, wherein the two units are carried in the prime mover zone, wherein the generator unit is operative to charge a storage battery and the battery is adapted to be electrically connected to the starting motor at will, wherein the generator unit is in permanent operative connection with the crank shaft of the engine and subject to the variable speed conditions of engine service, and wherein the starting motor is adapted to be operatively connected to the crank shaft of the engine at will and is capable of producing a torque characteristic of sufficient value to start the engine under the low voltage service of the storage battery, independent generator and starting motor unit structural formations operative to meet such service conditions, said formations having dimensions to permit of installation within the free space limitations of the prime mover zone, said structural formations including a yoke and pole shoe construction having dimensions such as to permit installation in the magnetic circuit formation of either the generator or the starting motor, the armature construction of both units being of similar dimensions and of similar number of winding slots.

5. In starting systems of the two-unit type adapted for use in motor vehicle service, wherein the prime mover is of the internal combustion engine type and carried by the chassis of the vehicle and positioned within a zone underlying the vehicle hood, wherein the two units are carried in the prime mover zone, wherein the generator unit is operative to charge a storage battery and the battery is adapted to be electrically connected to the starting motor at will, wherein the generator unit is in permanent operative connection with the crank shaft of the engine and subject to the variable speed conditions of engine service, and wherein the starting motor is adapted to be operatively connected to the crank shaft of the engine at will and is capable of producing a torque characteristic of sufficient value to start the engine under the low voltage service of the storage battery, independent generator and starting motor unit structural formations operative to meet such service conditions, said formations having dimensions to permit of installation within the free space limitations of the prime mover zone, said structural formations including a yoke and pole shoe construction having dimensions such as to permit installation in the magnetic circuit formation of either the generator or the starting motor, the armature construction of both units being of similar dimensions and of similar number of winding slots with the yoke serving as a casing element of the unit in which it is installed.

6. In starting systems of the two-unit type adapted for use in motor vehicle service, wherein the prime mover is of the internal combustion engine type and carried by the chassis of the vehicle and positioned within a zone underlying the vehicle hood, wherein the two units are carried in the prime mover zone, wherein the generator unit is operative to charge a storage battery and the battery is adapted to be electrically connected to the starting motor at will, wherein the generator unit is in permanent operative connection with the crank shaft of the engine and subject to the variable speed conditions of engine service, and wherein the starting motor is adapted to be operatively connected to the crank shaft of the engine at will and is capable of producing a torque characteristic of sufficient value to start the engine under the low voltage service of the storage battery, independent generator and starting motor unit structural formations operative to meet such service conditions, said formations having dimensions to permit of installation within the free space limitations of the prime mover zone, said structural formations including a yoke and pole shoe construction having dimensions such as to permit installation in the magnetic circuit formation of either the generator or the starting motor, the armature and commutator construction of both units being of similar dimensions and of similar number of winding slots and commutator bars.

7. In starting systems of the two-unit type adapted for use in motor vehicle service, wherein the prime mover is of the internal combustion engine type and carried by the chassis of the vehicle and positioned within a zone underlying the vehicle hood, wherein the two units are carried in the prime mover zone, wherein the generator unit is operative to charge a storage battery and the battery is adapted to be electrically connected to the starting motor at will, wherein the generator unit is in permanent operative connection with the crank shaft of the engine and subject to the variable speed conditions of engine service, and wherein the starting motor is adapted to be operatively connected to the crank shaft of the engine at will and is capable of producing a torque characteristic of sufficient value to start the engine under the low voltage service of the storage battery, independent generator and starting motor unit structural formations, operative to meet such service conditions, said formations having dimensions to permit of installation within the free space limitations of the prime mover zone, said structural formations including armature construction having the same general dimensions and number of winding slots in both units, the windings being similarly arranged in both units and differing in resistance characteristic in the units.

8. In starting systems of the two-unit type adapted for use in motor vehicle service, wherein the prime mover is of the internal combustion engine type and carried by the chassis of the vehicle and positioned within a zone underlying the vehicle hood, wherein the two units are carried in the prime mover zone, wherein the generator unit is operative to charge a storage battery and the battery is adapted to be electrically connected to the starting motor at will, wherein the generator unit is in permanent operative connection with the crank shaft of the engine and subject to the variable speed conditions of engine service, and wherein the starting motor is adapted to be operatively connected to the crank shaft of the engine at will and is capable of producing a torque characteristic of sufficient value to start the engine under the low voltage service of the storage battery, independent generator and starting motor unit structural formations operative to meet such service conditions, said formations having dimensions to permit of installation within the free space limitations of the prime mover zone, said structural formations including field construction of the same general dimensions in both units to produce magnetic circuit characteristics similar in the two units.

9. In starting systems of the two-unit type adapted for use in motor vehicle service, wherein the prime mover is of the internal combustion engine type and carried by the chassis of the vehicle and positioned within a zone underlying the vehicle hood, wherein the two units are carried in the prime mover zone, wherein the generator unit is operative to charge a storage battery and the battery is adapted to be electrically connected to the starting motor at will, wherein the generator unit is in permanent operative connection with the crank shaft of the engine and subject to the variable speed conditions of engine service, and wherein the starting motor is adapted to be operatively connected to the crank shaft of the engine at will and is capable of producing a torque characteristic of sufficient value to start the engine under the low voltage service of the storage battery, independent generator and starting motor unit structural formations operative to meet such service conditions, said formations having dimensions to permit of installation within the free space limitations of the prime mover zone, said structural formations including field construction of the same general dimensions in both units to produce magnetic circuit characteristics similar in the two units, the field windings of one unit differing in resistance characteristic from the field windings of the other unit.

10. In starting systems of the two-unit type adapted for use in motor vehicle service, wherein the prime mover is of the internal combustion engine type and carried by the chassis of the vehicle and positioned within a zone underlying the vehicle hood, wherein the two units are carried in the prime mover zone, wherein the generator unit is operative to charge a storage battery and the battery is adapted to be electrically connected to the starting motor at will, wherein the generator unit is in permanent operative connection with the crank shaft of the engine and subject to the variable speed conditions of engine service, and wherein the starting motor is adapted to be operatively connected to the crank shaft of the engine at will and is capable of producing a torque characteristic of sufficient value to start the engine under the low voltage service of the storage battery, independent generator and starting motor unit structural formations operative to meet such service conditions, said formations having dimensions to permit of installation within the free space limitations of the prime mover zone, said structural construction having field and armature construction having dimensions to produce magnetic circuits of the same length characteristic in both units.

11. In starting systems of the two-unit type adapted for use in motor vehicle service, wherein the prime mover is of the internal combustion engine type and carried by the chassis of the vehicle and positioned within a zone underlying the vehicle hood, wherein the two units are carried in the prime mover zone, wherein the generator unit is operative to charge a storage battery and the battery is adapted to be electrically connected to the starting motor at will, wherein the generator unit is in permanent operative connection with the crank shaft of the engine and subject to the variable speed conditions of engine service, and wherein the starting motor is adapted to be operatively connected to the crank shaft of the engine at will and is capable of producing a torque characteristic of sufficient value to start the engine under the low voltage service of the storage battery, independent generator and starting motor unit structural formations operative to meet such service conditions, said formations having dimensions to permit of installation within the free space limitations of the prime mover zone, said structural formations including armature construction of the same general dimensions in both units, with each armature having twenty-one slots for its windings.

12. In starting systems of the two-unit type adapted for use in motor vehicle service, wherein the prime mover is of the internal combustion engine type and carried by the chassis of the vehicle and positioned within a zone underlying the vehicle hood, wherein the two units are carried in the prime mover zone, wherein the generator unit is operative to charge a storage battery and the battery is adapted to be electrically connected to the starting motor at will, wherein the generator unit is in permanent operative connection with the crank shaft of the engine and subject to the variable speed conditions of engine service, and wherein the starting motor is adapted to be operatively connected to the crank shaft of the engine at will and is capable of producing a torque characteristic of sufficient value to start the engine under the low voltage service of the storage battery, independent generator and starting motor unit structural formations operative to meet such service conditions, said formations having dimensions to permit of installation within the free space limitations of the prime mover zone, said structural formations including a yoke and pole shoe construction having dimensions such as to permit installation in the magnetic circuit formation of either the generator or the starting motor and with the windings of the wave or two-circuit series drum winding type.

13. In starting systems of the two-unit type adapted for use in motor vehicle service, wherein the prime mover is of the internal combustion engine type and carried by the chassis of the vehicle and positioned within a zone underlying the vehicle hood, wherein the two units are carried in the prime mover zone, wherein the generator unit is operative to charge a storage battery and the battery is adapted to be electrically connected to the starting motor at will, wherein the generator unit is in permanent operative connection with the crank shaft of the engine and subject to the variable speed conditions of engine service, and wherein the starting motor is adapted to be operatively connected to the crank shaft of the engine at will and is capable of producing a torque characteristic of sufficient value to start the engine under the low voltage service of the storage battery, independent generator and starting motor unit structural formations operative to meet such service conditions, said formations having dimensions to permit of installation within the free space limitations of the prime mover zone, said structural formations including a yoke and pole shoe construction having dimensions such as to permit installation in the magnetic circuit formation of either the generator or the starting motor and with the windings of the wave or two-circuit series drum winding type, the conductor pitch providing not less than two slot-contained active portions of the conductor, with one active portion carried by the fifth slot beyond the slot carrying the adjacent active portion.

14. In starting systems of the two-unit type adapted for use in motor vehicle service, wherein the prime mover is of the internal combustion engine type and carried by the chassis of the vehicle and positioned within a zone underlying the vehicle hood, wherein the two units are carried in the prime mover zone, wherein the generator unit is operative to charge a storage battery and the battery is adapted to be electrically connected to the starting motor at will, wherein the generator unit is in permanent operative connection with the crank shaft of the engine and subject to the variable speed conditions of engine service, and wherein the starting motor is adapted to be operatively connected to the crank shaft of the engine at will and is capable of producing a torque characteristic of sufficient value to start the engine under the low voltage service of the storage battery, independent generator and starting motor unit structural formations operative to meet such service conditions, said formations having dimensions to permit of installation within the free space limitations of the prime mover zone, said structural formations including armature and commutator construction of the same general dimensions in both units, with the winding slots and commutator bars of a unit equal in number and of similar number in both units.

15. In starting systems of the two-unit type adapted for use in motor vehicle service, wherein the prime mover is of the internal combustion engine type and carried by the chassis of the vehicle and positioned within a zone underlying the vehicle hood, wherein the two units are carried in the prime mover zone, wherein the generator unit is operative to charge a storage battery and the battery is adapted to be electrically connected to the starting motor at will, wherein the generator unit is in permanent operative connection with the crank shaft of the engine and subject to the variable speed conditions of engine service, and wherein the starting motor is adapted to be operatively connected to the crank shaft of the engine at will and is capable of producing a torque characteristic of sufficient value to start the engine under the low voltage service of the storage battery, independent generator and starting motor unit structural formations operative to meet such service conditions, said formations having dimensions to permit of installation within the free space limitations of the prime mover zone, said structural formations including armature and commutator construction of the same general dimensions in both units, the winding slots and commutator bars of each unit being twenty-one in number.

16. In starting systems of the two-unit type adapted for use in motor vehicle service, wherein the prime mover is of the internal combustion engine type and carried by the chassis of the vehicle and positioned within a zone underlying the vehicle hood, wherein the two units are carried in the prime mover zone, wherein the generator unit is operative to charge a storage battery and the battery is adapted to be electrically connected to the starting motor at will, wherein the generator unit is in permanent operative connection with the crank shaft of the engine and subject to the variable speed conditions of engine service, and wherein the starting motor is adapted to be operatively connected to the crank shaft of the engine at will and is capable of producing a torque characteristic of sufficient value to start the engine under the low voltage service of the storage battery, independent generator and starting motor unit structural formations operative to meet such service conditions, said formations having dimensions to permit of installation within the free space limitations of the prime mover zone, said structural formations including armature and commutator construction of the same general dimensions in both units, the winding slots and commutator bars of each unit being twenty-one in number, the windings being arranged in a manner to locate one end of a conductor in electrical connection with the tenth commutator bar beyond the bar to which the opposite end is connected.

17. In starting systems of the two-unit type adapted for use in motor vehicle service, wherein the prime mover is of the internal combustion engine type and carried by the chassis of the vehicle and positioned within a zone underlying the vehicle hood, wherein the two units are carried in the prime mover zone, wherein the generator unit is operative to charge a storage battery and the battery is adapted to be electrically connected to the starting motor at will, wherein the generator unit is in permanent operative connection with the crank shaft of the engine and subject to the variable speed conditions of engine service, and wherein the starting motor is adapted to be operatively connected to the crank shaft of the engine at will and is capable of producing a torque characteristic of sufficient value to start the engine under the low voltage service of the storage battery, independent generator and starting motor unit structural formations operative to meet such service conditions, said formations having dimensions to permit of installation within the free space limitations of the prime mover zone, said structural formations including armature and commutator construction of the same general dimensions in both units, the winding slots and commutator bars of each unit being twenty-one in number, the windings being arranged in a manner to locate one end of a conductor in electrical connection with the tenth commutator bar beyond the bar to which the opposite end is connected, with the slot-contained portions of the conductor positioned to locate one active portion in the fifth slot beyond another active portion.

18. In starting systems of the two-unit type adapted for use in motor vehicle service, wherein the prime mover is of the internal combustion engine type and carried by the chassis of the vehicle and positioned within a zone underlying the vehicle hood, wherein the two units are carried in the prime mover zone, wherein the generator unit is operative to charge a storage battery and the battery is adapted to be electrically connected to the starting motor at will, wherein the generator unit is in permanent operative connection with the crank shaft of the engine and subject to the variable speed conditions of engine service, and wherein the starting motor is adapted to be operatively connected to the crank shaft of the engine at will and is capable of producing a torque characteristic of sufficient value to start the engine under the low voltage service of the storage battery, independent generator and starting motor unit structural formations operative to meet such service conditions, said formations having dimensions to permit of installation within the free space limitations of the prime mover zone, said structural formations including casing structure for the respective units, said casing structure being of the same dimensions and configuration in both units, said casing structure comprising a yoke circular in cross-section and carrying the pole pieces, a cap secured to one end of the yoke in overlying relation to the commutator structure of the unit, the cap having openings to afford access to the commutator structure, and a cover carried by the cap and overlying the cap openings.

19. In starting systems of the two-unit type adapted for use in motor vehicle service, wherein the prime mover is of the internal combustion engine type and carried by the chassis of the vehicle and positioned within a zone underlying the vehicle hood, wherein the two units are carried in the prime mover zone, wherein the generator unit is operative to charge a storage battery and the battery is adapted to be electrically connected to the starting motor at will, wherein the generator unit is in permanent operative connection with the crank shaft of the engine and subject to the variable speed conditions of engine service, and wherein the starting motor is adapted to be operatively connected to the crank shaft of the engine at will and is capable of producing a torque characteristic of sufficient value to start the engine under the low voltage service of the storage battery, independent generator and starting motor unit structural formations operative to meet such service conditions, said formations having dimensions to permit of installation within the free space limitations of the prime mover zone, said structural formations including casing structure for the respective units, said casing structure being of the same dimensions and configuration in both units, said casing structure comprising a yoke circular in cross-section and carrying the pole pieces, a cap secured to one end of the yoke in overlying relation to the commutator structure of the unit, the cap having openings to afford access to the commutator structure, and a cover carried by the cap and overlying the cap openings, the cap being of sheet metal and having a portion adapted to receive and position a bearing for one end of the armature shaft.

20. In starting systems of the two-unit type adapted for use in motor vehicle service, wherein the prime mover is of the internal combustion engine type and carried by the chassis of the vehicle and positioned within a zone underlying the vehicle hood, wherein the two units are carried in the prime mover zone, wherein the generator unit is operative to charge a storage battery and the battery is adapted to be electrically connected to the starting motor at will, wherein the generator unit is in permanent operative connection with the crank shaft of the engine and subject to the variable speed conditions of engine service, and wherein the starting motor is adapted to be operatively connected to the crank shaft of the engine at will and is capable of producing a torque characteristic of sufficient value to start the engine under the low voltage service of the storage battery, independent generator and starting motor unit structural formations operative to meet such service conditions, said formations having dimensions to permit of installation within the free space limitations of the prime mover zone, said structural formations including casing structure for the respective units, said casing structure being of the same dimensions and configuration in both units, said casing structure comprising a yoke circular in cross-section and carrying the pole pieces, a cap secured to one end of the yoke in overlying relation to the commutator structure of the unit, the cap having openings to afford access to the commutator structure, a cover carried by the cap and overlying the cap openings, and means differing in the units for closing the opposite end of the yoke.

21. In starting systems of the two-unit type adapted for use in motor vehicle service, wherein the prime mover is of the internal combustion engine type and carried by the chassis of the vehicle and positioned within a zone underlying the vehicle hood, wherein the two units are carried in the prime mover zone, wherein the generator unit is operative to charge a storage battery and the battery is adapted to be electrically connected to the starting motor at will, wherein the generator unit is in permanent operative connection with the crank shaft of the engine and subject to the variable speed conditions of engine service, and wherein the starting motor is adapted to be operatively connected to the crank shaft of the engine at will and is capable of producing a torque characteristic of sufficient value to start the engine under the low voltage service of the storage battery, independent generator and starting motor, unit structural formations operative to meet such service conditions, said formations having dimensions to permit of installation within the free space limitations of the prime mover zone, said structural formations including casing structure for the respective units, said casing structure being of the same dimensions and configuration in both units, said casing structure comprising a yoke circular in cross-section and carrying the pole pieces, a cap secured to one end of the yoke in overlying relation to the commutator structure of the unit, the cap having openings to afford access to the commutator structure, a cover carried by the cap and overlying the cap openings, and means differing in the units for closing the opposite end of the yoke, said means having configurations individual to the unit to permit detachable connection with the prime mover part with which the unit is adapted to operate.

22. In starting systems of the two-unit type adapted for use in motor vehicle service, wherein the prime mover is of the internal combustion engine type and carried by the chassis of the vehicle and positioned within a zone underlying the vehicle hood, wherein the two units are carried in the prime mover zone, wherein the generator unit is operative to charge a storage battery and the battery is adapted to be electrically connected to the starting motor at will, wherein the generator unit is in permanent operative connection with the crank shaft of the engine and subject to the variable speed conditions of engine service, and wherein the starting motor is adapted to be operatively connected to the crank shaft of the engine at will and is capable of producing a torque characteristic of sufficient value to start the engine under the low voltage service of the storage battery, independent generator and starting motor unit structural formations operative to meet such service conditions, said formations having dimensions to permit of installation within the free space limitations of the prime mover zone, said structural formations including casing structure for the respective units, said casing structure being of the same dimensions and configuration in both units, said casing structure comprising a yoke circular in cross-section and carrying the pole pieces, a cap secured to one end of the yoke in overlying relation to the commutator structure of the unit, the cap having openings to afford access to the commutator structure, a cover carried by the cap and overlying the cap openings, and means differing in the units for closing the opposite end of the yoke, the means of the motor unit including a projecting arm adapted to form a support for an extended portion of the armature shaft.

23. In starting systems of the two-unit type adapted for use in motor vehicle service, wherein the prime mover is of the internal combustion engine type and carried by the chassis of the vehicle and positioned within a zone underlying the vehicle hood, wherein the two units are carried in the prime mover zone, wherein the generator unit is operative to charge a storage battery and the battery is adapted to be electrically connected to the starting motor at will, wherein the generator unit is in permanent operative connection with the crank shaft of the engine and subject to the variable speed conditions of engine service, and wherein the starting motor is adapted to be operatively connected to the crank shaft of the engine at will and is capable of producing a torque characteristic of sufficient value to start the engine under the low voltage service of the storage battery, independent generator and starting motor unit structural formations operative to meet such service conditions, said formations having dimensions to permit of installation within the free space limitations of the prime mover zone, the storage battery being of set voltage and ampere rating characteristic, said structural formations including a yoke and pole shoe construction having dimensions such as to permit installation in the magnetic circuit formation of either the generator or the starting motor, the starting motor being operated by the storage battery and comprising a stator construction having the field windings arranged in series-parallel relation to provide two paths therethrough, and a rotor construction having the armature windings arranged in series relation to provide two paths therethrough and with the commutator brush formation arranged to produce a motor of the series type, said windings being of cross-sectional dimensions such as to provide a low resistance characteristic to the electrical circuits through the motor.

24. In starting systems of the two-unit type adapted for use in motor vehicle service, wherein the prime mover is of the internal combustion engine type and carried by the chassis of the vehicle and positioned within a zone underlying the vehicle hood, wherein the two units are carried in the prime mover zone, wherein the generator unit is operative to charge a storage battery and the battery is adapted to be electrically connected to the starting motor at will, wherein the generator unit is in permanent operative connection with the crank shaft of the engine and subject to the variable speed conditions of engine service, and wherein the starting motor is adapted to be operatively connected to the crank shaft of the engine at will and is capable of producing a torque characteristic of sufficient value to start the engine under the low voltage service of the storage battery, independent generator and starting motor unit structural formations operative to meet such service conditions, said formations having dimensions to permit of installation within the free space limitations of the prime mover zone, the storage battery being of set voltage and ampere rating characteristic, said structural formations including a yoke and pole shoe construction having dimensions such as to permit installation in the magnetic circuit formation of either the generator or the starting motor, the starting motor being operated by the storage battery and comprising a stator construction having the field windings arranged in series-parallel relation to provide two paths therethrough, and a rotor construction having the armature windings arranged in series relation to provide two paths therethrough and with the commutator brush formation arranged to produce a motor of the series type, said windings being of cross-sectional dimensions such as to provide a low resistance characteristic to the electrical circuits through the motor, with load variation effects controlled by voltage commutation.

25. In starting systems of the two-unit type adapted for use in motor vehicle service, wherein the prime mover is of the internal combustion engine type and carried by the chassis of the vehicle and positioned within a zone underlying the vehicle hood, wherein the two units are carried in the prime mover zone, wherein the generator unit is operative to charge a storage battery and the battery is adapted to be electrically connected to the starting motor at will, wherein the generator unit is in permanent operative connection with the crank shaft of the engine and subject to the variable speed conditions of engine service, and wherein the starting motor is adapted to be operatively connected to the crank shaft of the engine at will and is capable of producing a torque characteristic of sufficient value to start the engine under the low voltage service of the storage battery, independent generator and starting motor unit structural formations operative to meet such service conditions, said formations having dimensions to permit of installation within the free space limitations of the prime mover zone, the storage battery being of set voltage and ampere rating characteristic, said structural formation including a yoke and pole shoe construction having dimensions such as to permit installation in the magnetic circuit formation of either the generator or the starting motor, the starting motor being operated by the storage battery and comprising a stator construction having the field windings arranged in series-parallel relation to provide two paths therethrough, and a rotor construction having the armature windings arranged in series relation to provide two paths therethrough and with the commutator brush formation arranged to produce a motor of the series type, said windings being of cross-sectional dimensions such as to provide a low resistance characteristic to the electrical circuits through the motor, the ratio of armature ampere turns and the field ampere turns per pole being such as to maintain a powerful or stiff main field as compared to that of an armature field.

26. In starting systems of the two-unit type adapted for use in motor vehicle service, wherein the prime mover is of the internal combustion engine type and carried by the chassis of the vehicle and positioned within a zone underlying the vehicle hood, wherein the two units are carried in the prime mover zone, wherein the generator unit is operative to charge a storage battery and the battery is adapted to be electrically connected to the starting motor at will, wherein the generator unit is in permanent operative connection with the crank shaft of the engine and subject to the variable speed conditions of engine service, and wherein the starting motor is adapted to be operatively connected to the crank shaft of the engine at will and is capable of producing a torque characteristic of sufficient value to start the engine under the low voltage service of the storage battery, independent generator and starting motor unit structural formations operative to meet such service conditions, said formations having dimensions to permit of installation within the free space limitations of the prime mover zone, said structural formations including a yoke and pole shoe construction having dimensions such as to permit installation in the magnetic circuit formation of either the generator or the starting motor, said generator comprising a rotor having the armature windings arranged in series relation to provide two paths therethrough, and a stator construction having the field windings arranged in shunt-wound relation, the commutator construction including three brushes, one of which is operative to control the charging rate by controlling the voltage and current values in the shunt winding in the presence of variations in speed of the prime mover.

In testimony whereof I affix my signature in the presence of two witnesses.

FRED ALLISON.

Witnesses:—
J. K. HARNESS,
HORACE G. SEITZ.